United States Patent [19]
Bremner

[11] Patent Number: 5,327,978
[45] Date of Patent: Jul. 12, 1994

[54] EXTENDABLE LATCHABLE DRAFT LINK

[75] Inventor: Ronald D. Bremner, Cedar Falls, Iowa

[73] Assignee: Deere & Company, Moline, Ill.

[21] Appl. No.: 9,610

[22] Filed: Jan. 27, 1993

[51] Int. Cl.⁵ .................. B60D 1/00; A01B 59/06
[52] U.S. Cl. ................... 172/439; 172/272; 280/478.1; 280/482; 403/325; 403/330
[58] Field of Search ............ 280/482, 478.1; 172/439, 272; 403/330, 325

[56] References Cited

U.S. PATENT DOCUMENTS

| | | | |
|---|---|---|---|
| 2,340,786 | 2/1944 | Winn | 280/478.1 |
| 2,717,163 | 9/1955 | Martin | 280/482 X |
| 3,226,818 | 1/1966 | Abbott | 29/441 |
| 3,384,937 | 5/1968 | Muncke et al. | 24/238 |
| 3,437,355 | 4/1969 | Jeffes | 280/478 |
| 3,446,518 | 5/1969 | Dodgson et al. | 280/482 |
| 3,643,976 | 2/1972 | Haupt et al. | 280/478 R |

OTHER PUBLICATIONS

Deere & Co., "Tractors-Fundamentals of Machine Operation" pp. 188 & 189, 1981.

*Primary Examiner*—Randolph A. Reese
*Assistant Examiner*—Christopher J. Novosad

[57] ABSTRACT

A telescoping draft link assembly includes a hollow first tractor-coupled link and a second implement-coupled link slidably received by a channel in the first link. A pocket is formed in the first link next to the channel. A plate is pivotally mounted in the pocket and is pivotal from a release position wherein the plate is entirely received in the pocket to a locking position wherein at least a portion of the plate projects into the channel. The second link has a notch formed therein, an end of the notch forming a shoulder which is engageable with the plate to releasably hold the second link in the retracted position. A spring is biased to urge the plate towards its locking position and a knob is attached to the plate so that an operator may pivot the plate to a release position.

13 Claims, 2 Drawing Sheets

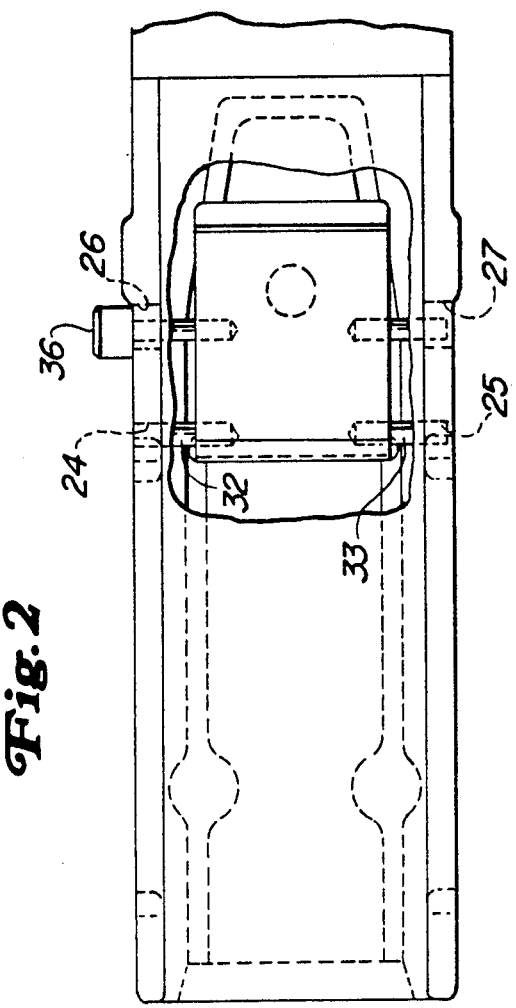

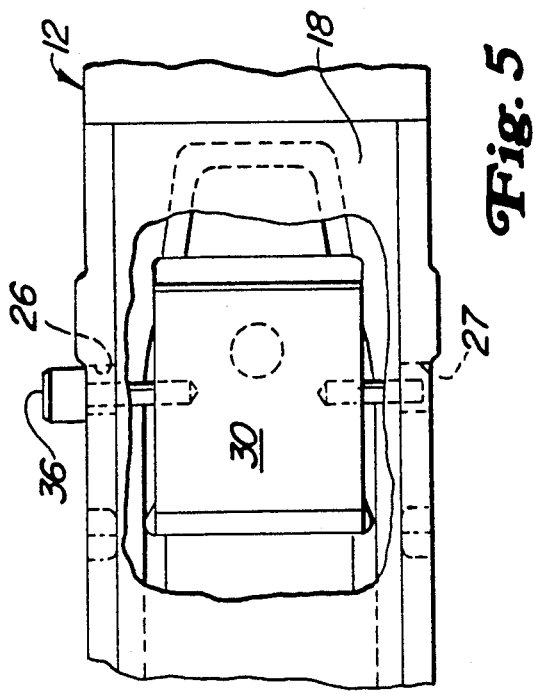
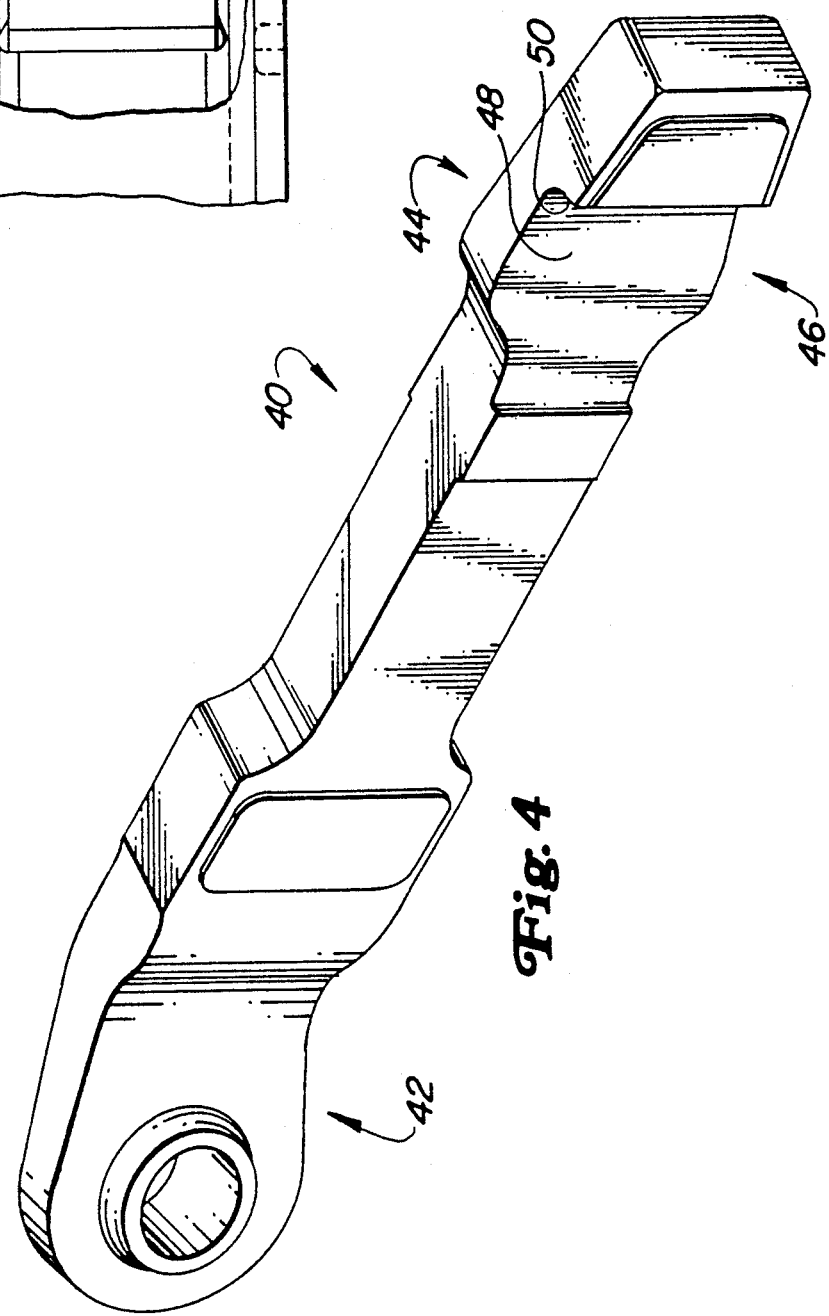

EXTENDABLE LATCHABLE DRAFT LINK

BACKGROUND OF THE INVENTION

The invention relates to a latchable telescoping draft ling assembly.

A known telescopic draft link assembly available with John Deere tractors includes an implement coupling link which slides inside a channel in another link which is coupled to the tractor. The implement link is latched or held in place by a cylindrical pin which is biased by a spring into corresponding bores in the links. Such an assembly must be accurately machined to function properly. Also, the latch pin is subjected to shear or tensile forces and may "freeze up". Another known telescopic draft link assembly includes a part that falls into a slot in the draft link end by gravity. Such an assembly must also be accurately machined to function properly, especially if the parts are forged. It would be desirable to have a telescopic draft link assembly which is simple to machine.

SUMMARY OF THE INVENTION

Accordingly, an object of this invention is to provide a telescopic draft link assembly which is simple to machine.

Another object of this invention is to provide such a draft link assembly with a latch mechanism which is not subjected to shear or tensile forces.

Another object of this invention is to provide such a draft link assembly with a latch mechanism which is unlikely to "freeze up".

Another object of this invention is to provide such a draft link assembly wherein the left and right components can be made from the same forgings.

These and other objects are achieved by the present invention, wherein a telescoping draft link assembly includes a hollow tractor-mounted link and an implement-coupling link slidably received by a channel in the tractor-mounted link. A pocket is formed in the tractor-mounted link next to the channel. A plate is pivotally mounted in the pocket and is pivotal from a release position wherein the plate is entirely received in the pocket to a locking position wherein at least a portion of the plate projects into the channel. The implement-coupling link has a notch formed therein. An end of the notch forms a shoulder which is engageable with the plate to releasably hold the implement-coupling link in a retracted position. A spring is biased to urge the plate towards its locking position and a knob is attached to the plate so that an operator may pivot the plate to a release position.

BRIEF DESCRIPTION OF THE DRAWINGS

FIG. 1 is a partial sectional top view of a telescoping draft link assembly constructed according to the present invention;

FIG. 2 is view in the direction of arrows 2—2 of FIG. 1, with portions removed for clarity;

FIG. 3 is a view taken along lines 3—3 of FIG. 1;

FIG. 4 is a perspective view of the implement-coupling link portion of the present invention; and FIG. 5 is a view similar to FIG. 2, but showing an alternate preferred embodiment of the present invention.

DETAILED DESCRIPTION

Referring to FIGS. 1-3, a telescoping draft link assembly 10 includes a hollow first link 12 for coupling to a tractor (not shown). The aft end portion of link 12 is substantially U-shaped, with upper wall 14 and lower wall 16, as best seen in FIG. 3. A plate 18 is welded to the walls 14, 16 to enclose a channel 20. A forged pocket 22 is also formed in the first link 12. The pocket 22 is open to and adjacent to the forward end of the channel 20. A pair of pivot bores 24 and 25 extend vertically through the walls 14 and 16 and are aligned with the aft end of pocket 22. A second set of bores 26 and 27 extend vertically through the walls 14 and 16 and are aligned with the central portion of pocket 22. A spring bore 28 extends horizontally through a side of link 12 and into pocket 22.

A generally rectangular latching plate 30 is mounted in the pocket 22. A pair of pivot pins 32 and 33 are press fit into corresponding bores in the top and bottom surfaces of the plate 30 near its aft end. The pins 32 and 33 are rotatably received in the pivot bores 24 and 25. A pair of posts 34 and 35 are press fit into corresponding bores near the center of the top and bottom surfaces of the plate 30. The posts 34 and 35 are received in the bores 26 and 27. The diameter of bores 26 and 27 are larger than the diameter of the posts 34 and 35 and the free-play therebetween permits the plate 30 to pivot about the axis of pins 32 and 33 between a latching position and a release position. A knob 36 is attached to the end of post 34 outside of wall 14 so that an operator can manipulate the plate 30 as desired. A blind bore 38 extends horizontally part way into the side of plate 30. It should be note that the lower post 35 and bore 27 could be eliminated because pins 32 and 33 and bores will be sufficient to maintain proper orientation of the plate 30 in the pocket 22.

As best seen in FIG., 4, a second link 40 has an aft end 42 for coupling to an implement (not shown) and a forward end 44 which is received by the channel 20. A notch 46 is formed on one side of link 40 near, but spaced apart from, its forward end. The notch 46 has a surface 48 which is slanted with respect a longitudinal axis of the link 40, which faces generally to the side and slightly forwardly, and which is joined to shoulder surface 50.

A coil spring 52 is mounted in spring bore 28 and is held in place by a screw which is screwed into a threaded outer portion of spring bore 28. The inner end of spring 52 is received by bore 38 in plate 30. The spring 52 is biased to pivot plate 30 about the axis of pivot pins 32 and 33 and to urge the forward end of the plate 30 out of the pocket 22 and into the channel 20.

Referring now to FIG. 5, there is shown a preferred embodiment which is similar to the embodiment of FIGS. 1-4, except that the pivot bores 24 and 25 and the pivot pins 32 and 33 are eliminated. In this case, the aft end of the plate 30 would be pivotally held in place in the pocket 22 between the link 12 and the surface of the link 40. Also, when the link 40 is removed from link 12, the spring 52 and the engagement between posts 34, 35 and bores 26, 27 will tend to hold the aft end of plate 30 in the position illustrated in FIG. 1.

As the link 40 is moved to right (viewing FIG. 1) into channel 20, the forward end of link 40 will engage plate 30 and push plate 30 into pocket 22 against the force of spring 52. Then, when notch 46 is adjacent to pocket 22 as shown in FIG. 1, the spring 52 automatically pivots plate 30 to a locking position wherein the end of the plate 30 projects into the notch 46. In this locking position, the forward end of plate 30 will engage the shoulder surface 50 and prevent inadvertent withdrawal of link 40 from channel 20. The plate 30 may be manually pivoted out of notch 46 by pushing on the knob 36, whereupon the link 14 may be removed or extended from the channel 20.

With this design the same parts can be used on the left and right sides of the tractor hitch (not shown). The latch plate 30 is subjected to compression forces only, and so is not subject to shear or tensile forces. The latch plate 30 is unlikely to "freezes up" as does the latch mechanism of alternate designs. If the pivot bores 24 and 25 and the pivot pins 32 and 33 are used, then only bores 24 and 25 need to be accurately machined into the link 12. Tolerances are not critical.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A telescoping link assembly having a hollow first link, a second link slidably received by a channel in the first link and latching means for releasably holding the second link in a retracted position with respect to the first link, wherein:
   the first link has a pocket formed therein adjacent to the channel;
   a plate is mounted in the pocket, the plate being pivotal from a release position wherein the plate is substantially received in the pocket to a locking position wherein at least a portion of the plate projects into the channel;
   a resilient member is biased to urge the plate towards its locking position;
   the second link has a shoulder surface formed therein, the shoulder surface being engageable with the plate to releasably hold the second link in the retracted position;
   a bore extends through a wall of the first link, the bore being aligned with a central portion of the pocket; and
   a post is fixed to a central portion of the plate and is loosely received by the bore, the post being engageable with the wall of the second bore to limit pivoting the plate.

2. The link assembly of claim 1, wherein:
   an aft end of the plate is pivotally held in the pockte between a surface of the second link and a surface of the first link.

3. The link assembly of claim 1, wherein:
   a pivot bore extends through a wall of the first link, the pivot bore being aligned with one end of the pocket; and
   a pivot pin is fixed to an end of the plate and is rotatably received by the pivot bore.

4. The link assembly of claim 3, wherein:
   the pivot bore and the pivot pin have vertically oriented axes.

5. The link assembly of claim 1, wherein:
   a manually operable knob is fixed to an end of the post outside of the first link.

6. The link assembly of claim 1, wherein:
   the bore has a diameter which is larger than a diameter of the post.

7. The link assembly of claim 1, wherein:
   a spring bore extends laterally through a wall of the first link and into the pocket; and
   the resilient member is mounted in the spring bore, one end of the resilient member engaging the plate.

8. The link assembly of claim 1, wherein:
   an upper pivot bore extends through a lower wall of the first link, the pivot bores being aligned with one end of the pocket;
   an upper pivot pin is fixed to an end of the plate and is rotatably received by the upper pivot bore; and
   lower pivot pin is fixed to an end of the plate and is rotatably received by the lower pivot bore.

9. The link assembly of claim 1, wherein:
   the second link has a notch formed therein, the notch forming the shoulder surface which is engageable with the plate.

10. The link assembly of claim 9, wherein:
    the shoulder surface faces substantially rearward.

11. The link assembly of claim 1, wherein:
    the second link has a notch formed therein, the notch forming a sideways and forwardly facing bottom surface which is slanted with respect to a longitudinal axis of the second link.

12. A telescoping link assembly having a hollow first link, a second link slidably received by a channel in the first link and latching means for releasably holding the second link in a retracted position with respect to the first link, wherein:
    the first link has a pocket formed therein adjacent to the channel;
    a plate is mounted in the pocket, the plate being pivotal from a release position wherein the plate is substantially received in the pocket to a locking position wherein at least a portion of the plate projects into the channel;
    a resilient member is biased to urge the plate towards its locking position;
    the second link has a shoulder surface formed therein, the shoulder surface being engageable with the plate to releasably hold the second link in the retracted position;
    a spring bore extends laterally through a wall of the first link and into the pocket;
    the resilient member is mounted in the spring bore, one end of the resilient member engaging the plate; and
    a blind bore extends into the plate, said one end of the resilient member being received by the blind bore.

13. A telescoping link assembly having a hollow first link, a second link slidably received by a channel in the first link and latching means for releasably holding the second link in a retracted position with respect to the first link, wherein:
    the first link has a pocket formed therein adjacent to the channel;
    a plate is mounted in the pocket, the plate being pivotal from a release position wherein the plate is substantially received in the pocket to a locking position wherein at least a portion of the plate projects into the channel;
    a resilient member is biased to urge the plate towards its linking position;
    the second link has a shoulder surface formed therein, the shoulder surface being engageable with the plate to releasably hold the second link in the retracted position;

a spring bore extends laterally through a wall of the first link and into the pocket;

the resilient member is mounted in the spring bore, one end of the resilient member engaging the plate;

an outer portion of the spring bore is threaded; and a screw is threaded into said outer portion to retain the resilient member in the spring bore.

* * * * *